United States Patent
Bradeen

(10) Patent No.: US 7,353,774 B2
(45) Date of Patent: Apr. 8, 2008

(54) SELECTIVE BIRD SUET DISPENSER AND METHOD OF FEEDING

(76) Inventor: Lyle Dean Bradeen, 1718 El Rancho Dr., Kalamazoo, MI (US) 49008

( * ) Notice: Subject to any disclaimer, the term of this patent is extended or adjusted under 35 U.S.C. 154(b) by 127 days.

(21) Appl. No.: 11/444,868

(22) Filed: Jun. 1, 2006

(65) Prior Publication Data
US 2007/0006809 A1    Jan. 11, 2007

Related U.S. Application Data

(60) Provisional application No. 60/687,891, filed on Jun. 7, 2005.

(51) Int. Cl.
*A01K 39/01* (2006.01)
(52) U.S. Cl. ............... 119/57.9; 119/57.8; 119/52.3
(58) Field of Classification Search ............ 119/51.01, 119/52.1, 52.2, 52.3, 57.8, 57.9, 63; D30/124, D30/128
See application file for complete search history.

(56) References Cited

U.S. PATENT DOCUMENTS

| | | | | |
|---|---|---|---|---|
| 4,144,842 A | * | 3/1979 | Schlising | 119/52.3 |
| 4,259,927 A | * | 4/1981 | Clarke | 119/57.9 |
| 5,289,796 A | * | 3/1994 | Armstrong | 119/52.3 |
| 5,291,855 A | * | 3/1994 | Laverty | 119/52.3 |
| 5,829,383 A | * | 11/1998 | Blanding | 119/52.3 |

\* cited by examiner

*Primary Examiner*—T. Nguyen

(57) ABSTRACT

A selective bird suet dispenser designed to feed bird suet to certain songbirds and woodpeckers while excluding starlings and other undesirable birds, this accomplished after a short transitional training period, suet dispenser is comprised of a cylindrical feed column, protective hood, with an elongate wooden perch attached vertically to the bottom, a top cap attached to a wire handle and fitted over top of feed column wherein a separate wire training basket is used, with a looped wire handle attached to top and a wooden perch attached to the bottom, basket is hung upon feeder post for a limited number of days then replaced with the selective bird suet dispenser having feed apertures at the bottom of column and protective hood at its uppermost position on feed column, hood is then lowered each day until feeding area is shielded from view, allowing preferred birds to feed unmolested by untrained and unwanted starlings and other pest birds.

1 Claim, 4 Drawing Sheets

SELECTIVE BIRD SUET DISPENSER AND METHOD OF FEEDING

I claim priority on provisional patent application No. 60/687,891 filed Jun. 7, 2005.

BACKGROUND

This version of the invention is concerned with the field of bird suet dispensers. More specifically, this version of the invention is concerned with a bird suet dispenser allowing songbirds and woodpeckers access to suet stored therein while preventing unwanted birds access to suet stored therein.

PRIOR ART

Bird feeders are available in a wide variety of designs, shapes, and configurations so as to provide bird food for numerous songbirds, woodpeckers, hummingbirds, and the like. Generally, bird feeders hold and dispense three basic types of bird feed: 1) loose bird feed, such as black sunflower seeds; 2) solids or cakes, such as suet or seed cakes, available in various shapes, such as square blocks or cylinders; and 3) liquid bird feed, such as sugar or flavored water for hummingbirds. A basic design consideration of any bird feeder is how to make the bird food stored therein available for the intended birds while shielding the bird food from unwanted birds or other animals, such as squirrels, raccoons, or other unwanted animals. For instance, some bird feeders are designed or can be modified with shields, domes, and the like to prevent squirrels from reaching the bird feeder. Similarly, other bird feeders are constructed with a relatively small perch or perch area to prevent unwanted birds from using the bird feeder, such as jays, crows, grackles, starlings, or birds that travel in flocks.

Starlings can present a particular problem when attempting to provide bird food to songbirds and woodpeckers. Starlings travel in large flocks and will descend upon a feeding area or bird feeder in great numbers, disturbing and chasing away feeding birds. In addition, starlings at smaller numbers are still problematic, as they possess an aggressive temperament and will intimidate the more docile songbirds and woodpeckers.

The subject of the instant invention introduces a bird suet dispenser along with a training basket that stores suet and other feed cakes therein, making access to said bird food available to certain desired birds, such as songbirds and woodpeckers, while preventing access of said bird food to starlings and other pest birds. The bird suet dispenser overcomes the disadvantages of previous designs by introducing a novel suet dispenser that can be adapted to acclimate and train in conjunction with the training basket a variety of desired birds to feed from said dispenser while excluding unwanted and disruptive birds.

DISCUSSION OF THE PRIOR ART

Numerous designs for bird feeders have been provided in the prior art. Even though these designs may be suitable for the specific individual purposes to which they address, they would not be suitable for the purposes of the present version of the invention as such designs are intended for use with loose bird seed, either with a conventional bird feeder or a bird feeder attempting to limit access to certain, desired birds. Furthermore, such designs, while limiting access of bird food to certain, desired birds, do so in a manner that makes the bird food difficult to obtain and do not provide adequate transition from completely open access to limited access. These designs are exemplified by the following patents:

U.S. Pat. No. 4,144,842, Access Limiting Bird Feeder, issued to Schlising on 20 Mar. 1979;

U.S. Pat. No. 4,462,337, Bird Feeder With Rotatable Cover, issued to Kilham on 31 Jul. 1984;

U.S. Pat. No. 4,646,686, Selective Bird Feeder, issued to Furlani on 3 Mar. 1987;

U.S. Pat. No. 5,163,382, Bird Feeder Apparatus, issued to Morrison on 17 Nov. 1992;

U.S. Pat. No. 5,295,455, Bird Excluding Technique, issued to Johnson on 22 Mar. 1994;

U.S. Pat. No. 5,297,503, Bird Feeder Protector, issued to Hibbard on 29 Mar. 1994; and U.S. Pat. No. 5,479,878, Bird Feeder, issued to Coulter on 2 Jan. 1996.

As illustrated by the background art, efforts are continuously being made in an attempt to develop bird feeders for various birds, especially bird feeders that limit access of bird food to certain, desired birds. No prior effort, however, provides the benefits attendant with the present invention. As such, it may be appreciated that there is a continuing need for a new and improved bird suet dispenser that can be adapted over time from providing complete and open access to bird food stored therein to providing limited access, allowing only certain, desired birds to find and reach said bird food. As necessary, the bird suet dispenser also provides a transitional or training period for said desired birds to become acquainted with bird suet available in limited access. In doing so, the bird suet dispenser does not overly restrict or interfere with the ability of said birds to find and reach bird suet stored therein. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY

The present version of the invention, which will be described in greater detail hereinafter, relates to the field of bird suet dispensers. More specifically, this version of the invention is concerned with a bird suet dispenser allowing songbirds and woodpeckers access to suet stored therein while preventing unwanted birds access to suet stored therein. My version of the invention overcomes all of the shortcomings listed previously, in addition to novel aspects that will be described in detail hereinafter.

Described briefly, according to a typical embodiment, the invention presents a selective bird suet dispenser that is comprised in part of a hollow cylindrical member having first and second opposed ends. First and second opposed apertures are located within the cylindrical member proximate to the first or top end thereof, and eight indentations are located within said cylindrical member at the second or bottom end thereof. A conically-shaped bottom cap is attached to the bottom end of the cylindrical member, said bottom cap having a central aperture and eight rods extending angularly from the a bottom rim of the bottom cap. The rods terminate at attachment to the cylindrical member within cooperating indentations, said rods forming a circular pattern commensurate with the diameter of the bottom end of the cylindrical member. Eight spaces or open areas are located between the rods, allowing access to the interior of the cylindrical member. A threaded fastener is disposed within the central aperture of the bottom cap and extends therefrom for some distance below said bottom cap.

First and second spacers are disposed within said first and second apertures of the cylindrical member, and first and second pins are disposed in respective first and second spacers. A portion of the shank of each pin extends beyond a cooperating fastener away from exterior sidewall of said cylindrical member, and an aperture is located within said portion of shank of each pin extending beyond cooperating fastener.

A cylindrical top cap is located on the first or top end of the cylindrical member. First and second projections are located on opposed sides of the top cap, said projections each having a central aperture therein. An elongate, looped handle with first and second ends is attached to the top cap and pins located within cooperating spacers and apertures of the cylindrical member. First and second ends of the handle are disposed within apertures of cooperating projections of the top cap and apertures of cooperating pins located within the cylindrical member. In this manner, the top cap can be detached from the cylindrical member, sliding along opposed ends of the handle and rotated with respect to the cylindrical member by means of the handle pivoting in response to said pins rotating within respective fasteners located within respective apertures of the cylindrical member.

A conically-shaped hood is slidingly attached to the exterior of the cylindrical member. A flange is located at the first or top end of the hood and makes direct contact with the cylindrical member. A clamp with opposed ends that receive a threaded fastener is fitted over the flange. The clamp can be tightened or loosened as necessary by the threaded fastener to exert or release pressure upon the flange so as to allow repositioning of the hood upon the cylindrical member.

An elongate, cylindrical perch is attached to the under side of the bottom cap. The perch at one end thereof contains a bore, which receives the threaded fastener extending below the bottom cap. A series of rings is located upon the exterior of the perch, each ring separated by a groove.

The cylindrical member, caps, hood, and clamp are comprised of material that is light weight, rigid, and impervious to corrosion and oxidation, such as various non-ferrous metals, plastics, fiberglass, composite materials, and the like. The perch is comprised of material appropriate for birds to land and perch thereon, such as various hardwoods configured with either a natural, textured surface or one that is machined smooth.

To use the selective bird suet dispenser, the top cap is removed from the cylindrical member as described previously, and a cylindrically-shaped section of bird suet or seed cake is inserted into the interior of said cylindrical member. The bird suet rests upon the conically-shaped bottom cap of the cylindrical member, and access to the bird suet is provided by the eight open areas or spaces between said eight rods extending from bottom cap and attached to second or bottom end of the cylindrical member. The bird suet dispenser is then hung upon a tree branch, bird feeder post, or the like. During initial use of the bird suet dispenser, the hood is located proximate to the first or top end of the cylindrical member so as to provide maximum exposure of the suet cake located between the bottom end of the cylindrical member and bottom cap and between eight rods extending from said bottom cap. As desired songbirds and woodpeckers become acclimated with the bird suet dispenser, the hood can be lowered upon the cylindrical member until the suet is completely shielded from view of starlings and pest birds. The songbirds and woodpeckers, trained to recall that suet is available through the openings of the bottom cap of the cylindrical member, will land upon the perch and climb up the perch until reaching the suet. In the meantime, the suet will be completely shielded from view of starlings and other pest birds.

If necessary, a training basket is used to train songbirds and woodpeckers to use the bird suet dispenser or to assist in the transition from complete access to the suet to limited access to said suet. The training basket is comprised of a basket proper with openings, a handle pivotally attached at the top side of said basket proper, and a perch attached to the bottom side of said basket proper. A section of bird suet or feed cake is inserted into the basket proper, and the training basket is hung by the handle upon a tree branch, bird feeder post, or the like. The basket with openings reveals the bird suet or feed cake to a greater degree than the cylindrical member, attracting desired songbirds and woodpeckers to land upon the perch and climb up the perch to reach exposed bird suet or feed cake.

My invention, therefore, resides not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

Accordingly, it is an object of my version of the invention to provide a low-cost, easy-to-manufacture, and easy-to-market selective bird suet dispenser.

A further object of my version of the invention is to provide an easy-to-use and versatile selective bird suet dispenser.

A significant object of the invention is to provide a selective bird suet dispenser that is comprised of a hollow cylindrical member having first and second opposed ends; an elongate, looped handle pivotally attached to the cylindrical member at the first or top end thereof; a top cap slidingly attached to said handle and located upon first or top end of said cylindrical member; a bottom cap with openings, said bottom cap attached to the cylindrical member at the second or bottom end thereof; an elongate cylindrical perch secured to the under side of said bottom cap; and a hollow cone slidingly attached to exterior of said cylindrical member, said cone able to be repositioned at various locations upon said cylindrical member to adjust access to suet stored within said cylindrical member and exposed though openings of said bottom cap.

A final but very significant object of the invention is to provide a selective bird suet dispenser that stores suet bird food and provides access to said bird suet for certain, desired songbirds and woodpeckers while preventing access of said bird suet to certain pest birds without restricting the ability of said desired birds to find and reach bird suet stored therein and, as necessary, allowing said desired birds to be trained and acquainted with bird suet available in limited access.

For a better understanding of the invention, its operating advantages and the specific objects attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention illustrated by the accompanying drawings.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

10 Selective Bird Suet Dispenser
12 Cylindrical Member
14 Top End
16 Bottom End
18 Sidewall
20 Interior Area
22a Aperture
22b Aperture
24 Indentation
26a Spacer
26b Spacer
28a Pin
28b Pin
30a Aperture
30b Aperture
32 Bottom Cap
34 Aperture
36 Rod
38 Opening
40 Fastener
42 Threaded Shank
44 Fastener Top
46 Top Cap
48a Projection
48b Projection
50a Aperture
50b Aperture
52 Handle
54a First End
54b Second End
56a Bent Section
56b Bent Section
58 Hood
60 Top End
62 Bottom End
64 Flange
66 Interior Area
68 Clamp
70 First End
72 Second End
74 Aperture
76 Threaded Fastener
78 Nut
80 Perch
82 Top End
84 Bottom End
86 Projection
88 Bore
90 Ring
92 Training Basket
94 Basket
96 Top End
98 Bottom End
100 Opening
102 Rim
104a Projection
104b Projection
106a Aperture
106b Aperture
108 Handle
110a First End
110b Second End 112a Bent Section
112b Bent Section
114 Bottom Sidewall
116 Washer
118 Fastener
120 Threaded Shank
122 Fastener Top

DESCRIPTION OF THE PREFERRED EMBODIMENT

Description

Figure 1:
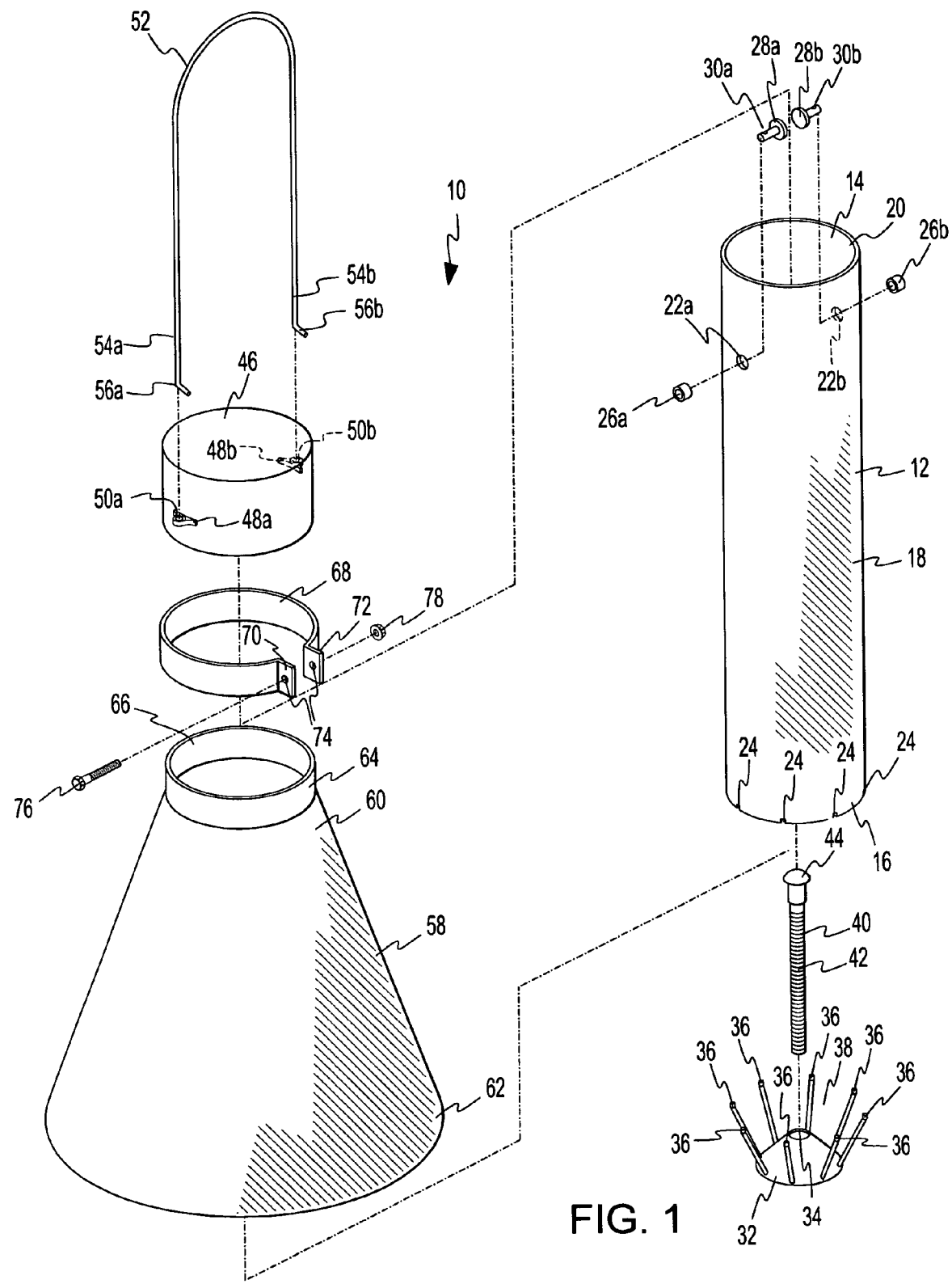
FIG. 1 is an exploded, perspective view of a bird suet dispenser in accordance with the present version of the invention, illustrating the constituent components thereof.

Referring now to the drawings and, in particular, to FIG. 1 wherein there is illustrated a typical embodiment of the selective bird suet dispenser 10. The present version of the invention 10 consists of a hollow, cylindrical member 12 having a top end 14, an opposed bottom end 16, and a continuous sidewall 18 located between said top 14 and bottom 16 ends. The top end 14, bottom end 16, and sidewall 18 enclose a hollow or interior space or area 20. A first aperture 22a is located within the sidewall 18 of the cylindrical member 12 proximate to the first end 14 thereof, and a second aperture 22b is located within the sidewall 18 of the cylindrical member 12 proximate to the first end 14 thereof and opposite to the first aperture 22a. Eight indentations 24 are located at the bottom end 16 of the cylindrical member 12, said indentations 24 spaced in equidistant sequence. In this version of the invention, the cylindrical member 12 is approximately 9 inches in length between top 14 and bottom 16 ends thereof and has an outside diameter of approximately 2 inches.

A first spacer 26a is aligned for insertion into the first aperture 22a of the cylindrical member 12, and a second spacer 26b is aligned for insertion into the second aperture 22b of the cylindrical member 12. Similarly, a first pin 28a is aligned for insertion into the first spacer 26a, and a second pin 28b is aligned for insertion into the second spacer 26b. An aperture 30a is located within the shank of the first pin 28a, and an aperture 30b is located within the shank of the second pin 28b.

A bottom cap 32, aligned for attachment to the bottom end 16 of the cylindrical member 12, is conical in shape and possesses an aperture 34 located at the top or apex thereof. Eight rods 36 are connected at first ends thereof to the bottom cap 32 at the bottom rim thereof and extend therefrom for some distance at X angle. A space 38 is located between any two rods 36, resulting in eight spaces 38 between the eight rods 36. The second, unattached ends of the rods 36 form a circular pattern, commensurate with the diameter of the bottom end 16 of the cylindrical member 12. The bottom cap 34 is attached to the cylindrical member 12 at the bottom end 16 thereof by inserting the unattached ends of the rods 36 into cooperating indentations 24 at the bottom end 16 of the cylindrical member 12. The unattached ends of the rods 36 can be secured within cooperating indentations 24 by various means, such as welding, soldering, frictional engagement, and the like. In this version of the invention, the bottom cap 34 at the bottom rim thereof has a diameter of approximately 1.25 inches.

A cylindrical fastener 40 with threaded shank 42 and round top 44 is aligned for insertion into the aperture 34 of the bottom cap 32. When the fastener 40 is fully inserted though the aperture 34, the fastener 40 rests upon the top 44 thereof over the aperture 34 with the threaded shank 42 thereof extending for some distance below said bottom cap 32.

A cylindrical top cap 46 is aligned for releasable attachment to the cylindrical member 12 over the top end 14 thereof. First 48a and second 48b opposed projections are located on opposed sides of the top cap 46. The first projection 48a contains an aperture 50a, and the second projection 48b contains an aperture 50b.

An elongate, looped handle 52 is aligned above the top cap 46. The handle 52 consists in part of a first end 54a, and a second opposed end 54b. The first end 54a terminates with a bent section 56a that extends at X angle in relation to the longitudinal axis of the first end 54a, and the second end 54b terminates with a bent section 56b that extends at X angle in relation to the longitudinal axis of the second end 54b. The handle 52 is secured to the top cap 46 by inserting first 54a and second ends 54b thereof into cooperating apertures 50a, 50b of respective projections 48a, 48b of said cap 46. First 56a and second 56b bent sections impinging against respective projections 48a, 48b prevent respective first 54a and second 54b ends of the handle 52 from completely sliding out of respective apertures 50a, 50b, thus retaining the handle 52 to the top cap 46.

Referring again to FIG. 1, a conically-shaped hood 58 is aligned for sliding attachment to the cylindrical member 12 over the continuous sidewall 18 thereof. The hood 58 is comprised of a narrower top end 60 and an opposed, wider bottom end 62. A circular flange 64 is located at the top end 60 and extends therefrom from approximately one-half inch. The hood 58 encloses a hollow, interior space 66 extending from the top of the flange 64 to the bottom end 62 of said hood 58. In this version of the invention, the hood 58 traverses a distance of approximately 5.75 inches between top 60 and bottom 62 ends thereof and has a diameter of approximately 5.75 inches at the bottom end 62 thereof. The flange 64 has an inside diameter of approximately 2 inches.

A clamp 68, aligned over the flange 64, terminates with first 70 and second 72 ends. Each end 70, 72 of the clamp 68 has a centrally-located aperture 74 therein. A threaded fastener 76 is aligned for insertion through said apertures 74 to receive a nut 78. When the clamp 68 is positioned over the flange 64, the clamp 68 can be tightened by the threaded fastener 76 and nut 78 to constrict the flange 64 over the continuous sidewall 18 of the cylindrical member 12, thus retaining the hood 58 at a particular location upon the sidewall 18 of the cylindrical member 12.

The cylindrical member 12, caps 32, 46, hood 58, and clamp 68 are comprised of material that is light weight, rigid, and impervious to corrosion and oxidation, such as various non-ferrous metals, plastics, fiberglass, composite materials, and the like.

Figure 2:
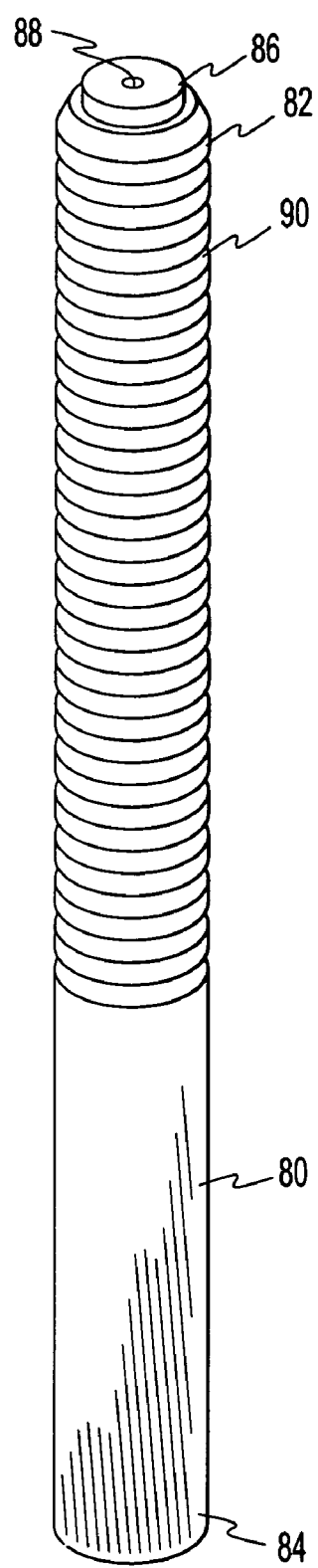
FIG. 2 is a perspective view of a bird perch for use with said bird suet dispenser in accordance with the present version of the invention.

Referring to FIG. 2, therein illustrated is a perch 80 for attachment to the bird suet dispenser 10 at the bottom cap thereof 32. The perch 80 is cylindrical in shape and is defined by a top end 82 and an opposed bottom end 84. A disc-shaped projection 86 is located at the top end 82 and extends therefrom for some distance. A cylindrical bore 88 is located centrally within the projection 86 and top end 82 of the perch 80. The length and diameter of the bore 88 is commensurate with the length and diameter of the threaded shank 42 of the fastener 40 disposed within the aperture 34 of the bottom cap 32 of the cylindrical member 12. A series of rings 90 is formed onto the exterior surface of the perch 80, said rings 90 extending downward from the top end 82 of the perch 80. Each ring 90 is separated by a groove of approximately 0.25 inch. In this version of the invention, the perch 80 is approximately 16-17 inches in length traversing the distance from the top end 82 to the bottom end 84 thereof and having a diameter of approximately 1.5 to 1.75 inches.

The number of rings 90 can vary; in this version of the invention, 19 rings 90 are located on the perch 80. The perch 80 is comprised of material appropriate for birds to land and perch thereon, such as various hardwoods configured with either a natural, textured surface or one that is machined smooth.

Figure 3:
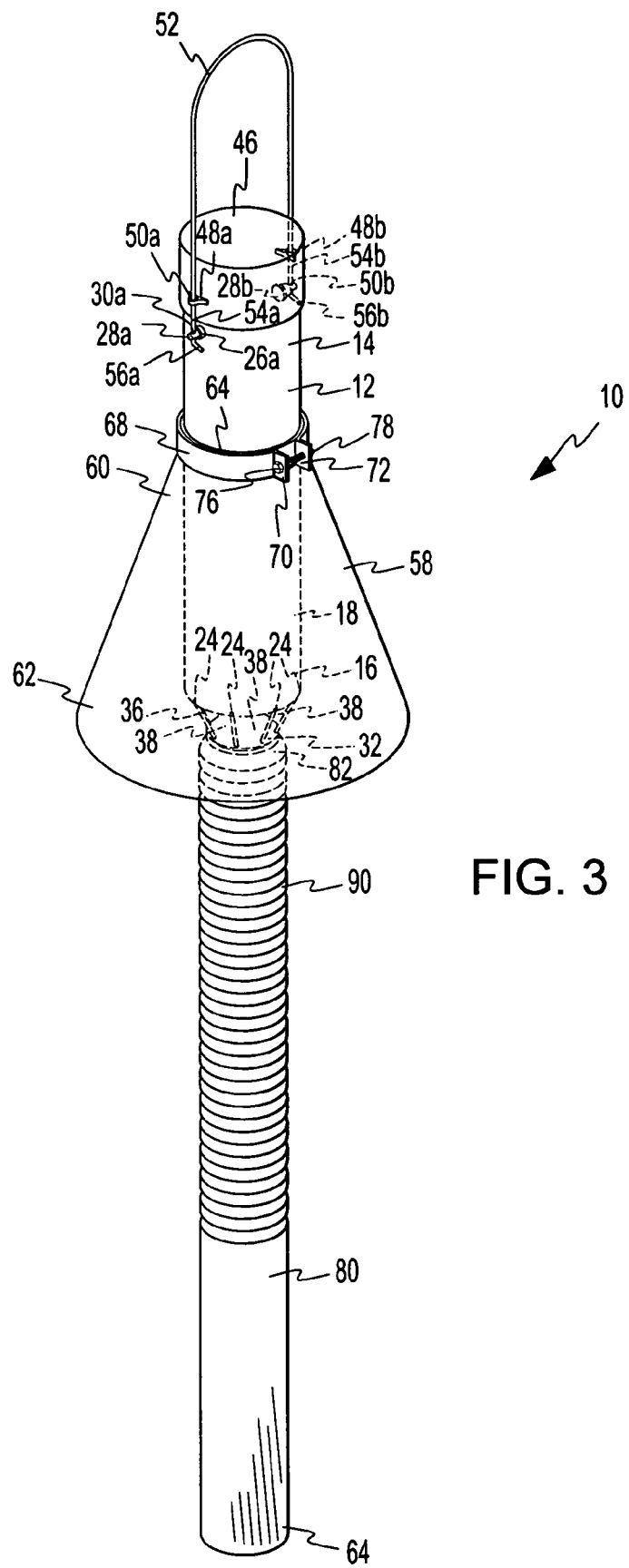
FIG. 3 is a perspective view of a bird suet dispenser assembled for use in accordance with the present version of the invention.

In FIG. 3, the bird suet dispenser 10 is illustrated as fully assembled and ready for use. The bottom cap 32 (shown in phantom line) is attached to the cylindrical member 12 at the bottom end 16 thereof in the manner described previously with ends of the rods 36 of the bottom cap 32 secured within cooperating indentations 24 at the bottom end 16 of the cylindrical member 12. As a result, eight spaces or openings 38 are located between the bottom end 16 of the cylindrical member 12 and bottom rim of the bottom cap 32. The perch 80 is attached to the underside of the bottom cap 32 by inserting the threaded shank 42 of the fastener 40 (FIG. 1) through the aperture 34 of the bottom cap 32 and into the bore 88 of the perch 80 wherein said shank 42 engages the sidewall of the bore 80.

The top cap 46 is fitted over the top end 14 of the cylindrical member 12 with first 54a and second 54b opposed ends of the handle 52 disposed through cooperating apertures 50a, 50b of respective projections 48a, 48b of the cap 46. The top cap 46 is secured to the top end 14 of the cylindrical member 12 by first 54a and second 54b opposed ends of the handle 52 extending through cooperating apertures 30a, 30b of respective pins 28a, 28b, said pins 28a, 28b disposed within respective spacers 26a, 26b located within respective apertures 22a, 22b of the cylindrical member 12. With the handle 52 secured to the pins 28a, 28b as such, the top cap 46 can be disengaged from the top end 14 of the cylindrical member 12 by pulling the top cap 46 off the cylindrical member 12 and sliding the projections 48a, 48b of the top cap 46 over respective ends 54a, 54b of the handle 52 until top cap 46 clears the top end 14 of the cylindrical member 12. At this point, the top cap 46 and handle 52 can be pivoted upon the pins 28a, 28b away from the top end 14 of the cylindrical member 12, said movement made possible by the pins 28a, 28b rotating within respective spacers 26a, 26b disposed within respective apertures 22a, 22b of the cylindrical member 12. Removing the top cap 46 and rotating the top cap 46 and handle 52 will provide unobstructed access to the interior area 20 of the cylindrical member 12 as needed to insert or replace a suet cake (not shown). When a suet cake is inserted within the interior area 20 of the cylindrical member 12, said cake rests upon the top or apex of the bottom cap 32, and access to said suet cake is provided by the eight spaces 38 separated by eight rods 36 of the bottom cap 32.

The hood 58 is slidingly attached to the continuous sidewall 18 of the cylindrical member 12 at various locations thereon. The clamp 68 is fitted over the flange 64 of the hood 58 and tightened as described previously to constrict the flange 64, thereby causing the flange 64 to frictionally engage cooperating section of the sidewall 18 of the cylindrical member 12. The hood 58 can be raised or lowered upon the cylindrical member 12 by loosening the threaded fastener 76 and nut 78, thereby releasing clamp pressure exerted upon the flange 64, and sliding the hood 58 up or down upon the cylindrical member 12 as desired.

Figure 4:
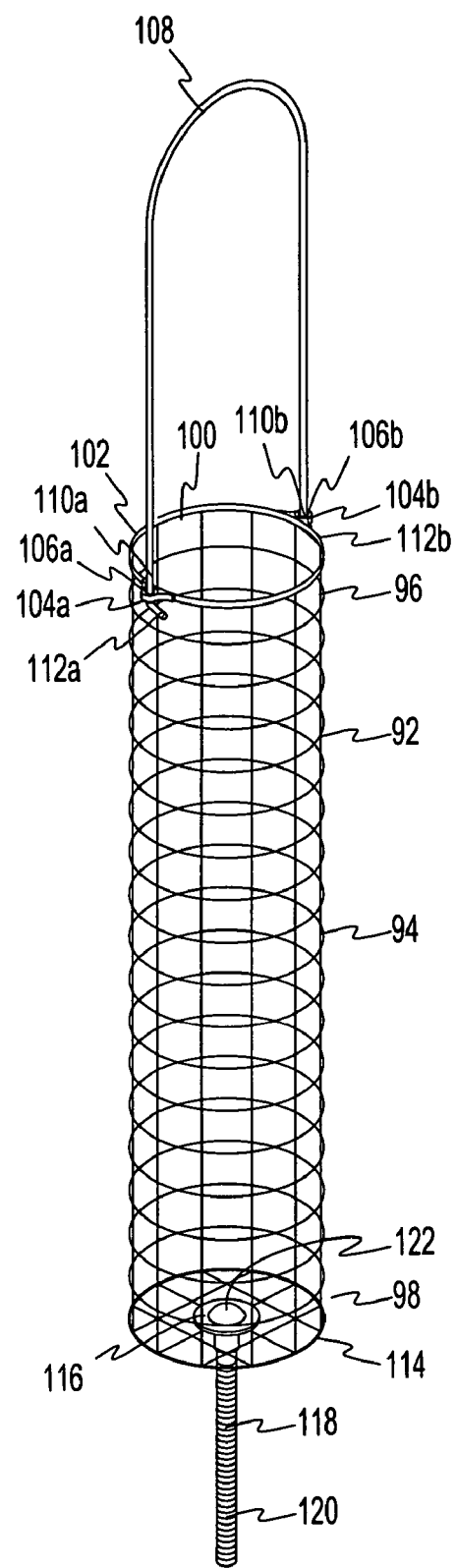
FIG. 4 is a perspective view of a training basket in accordance with the present version of the invention.

A training basket 92 is illustrated in FIG. 4. The training basket 92 is designed to acclimate birds to the bird suet dispenser 10. The training basket 92 is comprised of a basket 94 proper, said basket 94 defined in part by a top end 96 and a bottom end 98. The basket 94 has an opening 100 at the top end thereof 96, said opening 100 providing access to the interior of said basket 94. A rim 102 is located at the top end of the basket 94 and contains on opposed sides thereof a first projection 104a and a second projection 104b. The first projection 104a has a central aperture 106a, and the second projection 104b has a central aperture 106b.

In this version of the invention, the basket 94 is approximately 9 inches in length from the top end 96 to the bottom end 98 and possesses a diameter of approximately 2 inches. It 94 is comprised of hardware cloth or similar material having a weave density of approximately one-half inch.

A looped handle 108 is connected to the basket 94 at the top end 96 thereof, said handle 108 comprised in part of first 110a and second 110b opposed ends. The first end 110a terminates with a bent section 112a that extends at X angle in relation to the longitudinal axis of the first end 110a, and the second end 10b terminates with a bent section 112b that extends at X angle in relation to the longitudinal axis of the second end 110b. The handle 108 is secured to the top end of the basket 94 by inserting first 110a and second ends 110b thereof into cooperating apertures 106a, 106b of respective projections 104a, 104b located on said rim 102. First 112a and second 112b bent sections impinging against respective projections 104a, 104b prevent respective first 110a and second 110b ends of the handle 108 from completely sliding out of respective apertures 106a, 106b, thus retaining the handle 108 to the basket 94.

A bottom sidewall 114 is located at the bottom end 98 of the basket 94, and a washer 116 is located centrally upon said sidewall 114. A fastener 118 with threaded shank 120 and rounded top 122 is disposed centrally within said washer 116. The threaded shank 120 of the fastener 118 extends for some distance below the bottom sidewall 114 of the basket 94. The perch 80 can be attached to the underside of the bottom sidewall 114 of the basket 94 by inserting the threaded shank 120 of the fastener 118 into the bore 88 of the perch 80 wherein said shank 120 engages the sidewall of the bore 80.

During use of the training basket 92, a perch 80 is secured at the bottom of the basket 94 proper upon the fastener as described previously, and a suet cake (not shown) is inserted into the interior of the basket 94 through the opening 100 thereof. The training basket 92 is hung upon the handle 108 from a tree branch, bird feeder post, or the like. Songbirds and woodpeckers will land and climb up or down the perch 80, eventually pulling suet through the one-half inch openings of the basket 94 weave. This exercise will acclimate songbirds and woodpeckers to using the perch 80 and pulling suet from between a defined or enclosed area, not unlike the openings 38 between the rods 36 of the bottom cap 32 of the suet dispenser 10.

Before using the suet dispenser 10, any suet dispensers or feeders existing in the feeding location intended for the suet dispenser 10 are removed. The suet dispenser 10 can be hung from a tree branch, bird feeder post, or the like before use of the training basket 92, or feeding can begin with the training basket 92, depending upon the birds' initial reaction to the suet dispenser 10.

When the opportunity has arrived for using the suet dispenser 10, said dispenser 10 is hung from the handle 52 thereof upon a tree branch, bird feeder post, or the like in a location suitable for attracting desired birds. Initially, the hood 58 is positioned high upon the cylindrical member 12 with the flange 64 and clamp 68 proximate to the pins 28a, 28b so as to allow most access to the suet exposed by openings 38 of the bottom cap 32. As songbirds and woodpeckers become acclimated with the suet dispenser 10, climbing up and down the perch 80, the hood 58 can be lowered until bottom 62 of hood 58 is level with top of openings 38. Over time the hood 58 can be lowered in increments until the bottom 62 of the hood 58 is level at the junction of bottom of cap 32 and top 82 of the perch 80. The openings 38 (and suet exposed by said openings) are mostly obscured from view, and only the songbirds and woodpeckers that have become acclimated with use of the suet dispenser 10 will continue to use the suet dispenser 10 for feeding. Pest birds, such as starlings, will avoid the suet dispenser 10 as the openings 38 and suet available through said openings 38 are mostly obscured from view, the space under the hood 58 for retrieving the suet is relatively confined, and the only way for birds to reach said openings 38 and suet made available by said openings 38 is to climb up or down the perch 80, all of which function to keep starlings from using the suet dispenser 10.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

CONCLUSION AND SCOPE OF INVENTION

From the foregoing, it will be understood by persons skilled in the art that an improved bird suet dispenser has been provided. The invention is relatively simple and easy to manufacture, yet affords a variety of uses. While my description contains many specificities, these should not be construed as limitations on the scope of the version of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed:

1. A selective bird suet dispenser for feeding songbirds and woodpeckers while excluding all unwanted pest birds access to said bird suet dispenser comprising:

a) A hollow cylindrical feed column comprised of non-corrosive metal, plastic, or fiberglass having a top end and a bottom end, a first aperture and a second aperture opposes to said first aperture, and eight indentations, wherein said first and second apertures are located within the feed column proximate to the top end with a first pin having an aperture therein and said first pin located within co-operating spacer and said first aperture and with a second pin having an aperture therein and said second pin located within co-operating spacer and said second aperture and wherein said eight indentations are located at the bottom end thereof;

b) A cylindrical top cap having a first projection and a second projection, wherein said first and second projections are attached and located on opposite sides of the top cap with each projection having a central aperture therein, allowing the top cap to function as a protective cover for the bird suet dispenser;

c) An elongate looped wire handle having a first end and a second end, wherein said first end and said second end are attached to the top cap by having said first end and said second end disposed within said central apertures of said first and second projections and within said apertures of said first and second pins of the top cap, allowing the top cap to be detached from the feed column;

d) A conically shaped bottom cap having a central aperture and eight rods extending angularly from a bottom rim of said bottom cap, wherein said bottom cap is attached to the bottom end of the feed column by inserting said rods into said indentations so as to form eight equally proportioned feeding apertures, wherein a threaded fastener extends from the central aperture for a distance below said bottom cap;

e) A movable hood having a having a frustum shape with a top flange and made of non-ferrous, non corrosive metal, plastic or fiberglass wherein said hood is attached to the exterior of the feed column by a clamp having opposed ends with apertures therein and a threaded fastener inserted within said apertures of said clamp and a threaded receiver so that said hood can be easily adjusted into a higher or lower position along the length of the feed column;

f) An elongate cylindrical perch comprised of a hardwood, composite or plastic material suitable for songbirds and woodpeckers to land upon and negotiate while feeding on said bird suet dispenser, said perch having a plurality of spaced rings along a length of said perch with each ring separated by a groove and a threaded bore at the first end wherein said threaded bore connects to the threaded fastener extending below said bottom cap.

* * * * *